United States Patent [19]

Edwards

[11] 3,797,879
[45] Mar. 19, 1974

[54] CAB OR VAN VEHICLE AIR DEFLECTOR

[76] Inventor: John D. Edwards, 1033 N. Florence, Tulsa, Okla. 74110

[22] Filed: Nov. 10, 1972

[21] Appl. No.: 305,233

[52] U.S. Cl. ............... 296/1 S, 105/2 A, 296/91
[51] Int. Cl. ............................................ B62d 35/00
[58] Field of Search ........ 296/1 S, 91; 105/2 A, 2 R

[56] References Cited
UNITED STATES PATENTS

| | | | |
|---|---|---|---|
| 3,309,131 | 3/1967 | Saunders | 296/1 S |
| 3,415,566 | 12/1968 | Kerrigan | 296/1 S |
| 3,484,130 | 12/1969 | Read | 296/1 S |

Primary Examiner—Kenneth H. Betts
Assistant Examiner—John A. Pekar
Attorney, Agent, or Firm—Head and Johnson

[57] ABSTRACT

This invention describes a demountable type of air deflector device in the form of a triangular prism which can be attached to the upper front wall of a large van or semitrailer, and which extends over the top of the cab. The triangular shaped structure can have a closed top and bottom or, if desired, apparatus such as a refrigerating unit may be placed on the front wall of the van and air allowed to pass up through the air deflector past the refrigerating unit and up over the top of the van. Shock mounts may be provided for attaching the structure to the van, and means are provided for rapidly removing the deflector device as occasion demands.

7 Claims, 4 Drawing Figures

PATENTED MAR 19 1974 3,797,879

CAB OR VAN VEHICLE AIR DEFLECTOR

BACKGROUND OF THE INVENTION

This invention is in the field of large vans and semi-trailers. More particularly, it is concerned with providing air deflecting means to control the flow of air around the large van body and thereby minimize the air resistance developed due to rapid movement of the van body through the air.

In the prior art various means have been shown for adding deflector onto the roof of the cab so as to cause a deflection of air to the sides and up over the body of the van. These are obviously not as effective as the present invention since they do not connect positively to the outer surface of the van, as does this invention.

SUMMARY OF THE INVENTION

It is a primary object of this invention to provide a simple, demountable air deflector means that can be rapidly attached to or demounted from the top front wall of a large van, so that as the van is moved through the air, the oncoming air will be deflected to the sides, without a corresponding build up of pressure in front of the van.

This and other objects are realized and the limitations of the prior art are overcome in this invention by providing a triangular shaped wind screen mounted on the front wall of the van so as to overhang the top of the cab. This pointed wind screen can be triangular in horizontal cross section and with top and bottom closed. Conversely, the top and bottom can be open to permit air flow under, upward, inside of the screen, and over the top of the van. This provides opportunity for a small quantity of air to flow upward through the screen and over a device such as a refrigerating unit, etc. which may be mounted on the front wall of the van. The wind screen is preferably mounted on rubber shock mounts and can be rapidly attached to or dismounted from the van by bolts or other means. The clamp system, which holds the deflector, can be mounted directly, by bolts, to the van body, or if desired, the clamps can be attached to long vertical straps, which are hooked over projections on the top and bottom edges of the van body and are tightened by screw means to be securely attached to the front surface of the van.

BRIEF DESCRIPTION OF THE DRAWINGS

These and other objects of this invention and a better understanding of the principles and details of the invention will be evident from the following description taken in conjunction with the appended drawings, in which.

DESCRIPTION OF THE PREFERRED EMBODIMENT

Figure 1:
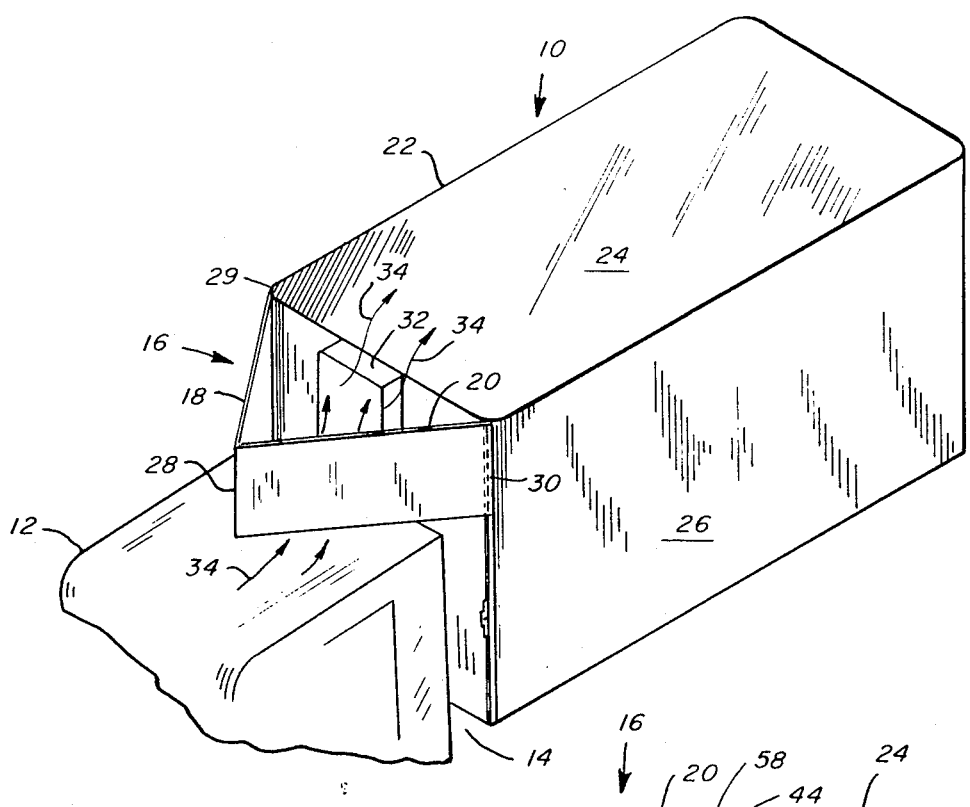
FIG. 1 indicates a general view of a cab and van system with one embodiment of the wind screen of this invention attached to the front top surface of the van.

Referring now to the drawings and particularly to FIG. 1, there is shown a general view, identified by numeral 10, of a truck cab and van assembly, with a view of the wind screen 16 of this invention. The wind screen is in the form of a triangular prism having a front vertical edge 28, two sides 18 and 20, and means along second edges 29 and 30 for attachment to the front wall of the van body 22. The van has a top 24 and sides 26. The prism 16 has a clearance 19 above the roof of the cab 12 so as to permit relative motion of the van and the cab when the van body is on a semi-trailer, for example. This is shown in FIG. 2.

Figure 2:
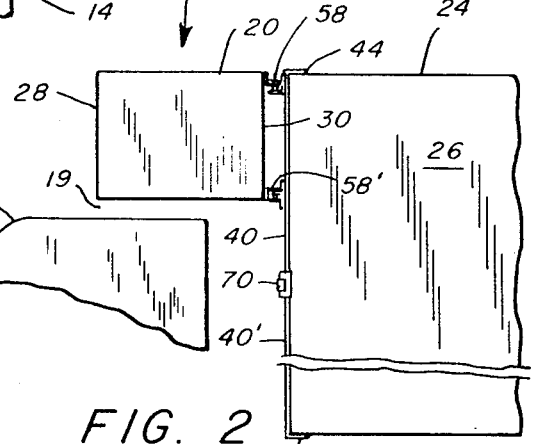
FIG. 2 indicates a side view of the van, the wind screen, and the cab.

FIG. 2 shows in side elevation the cab 12, the van wall 26 and the wind screen 16 which is attached by brackets 58 and 58' to the front wall of the van.

Figure 3:
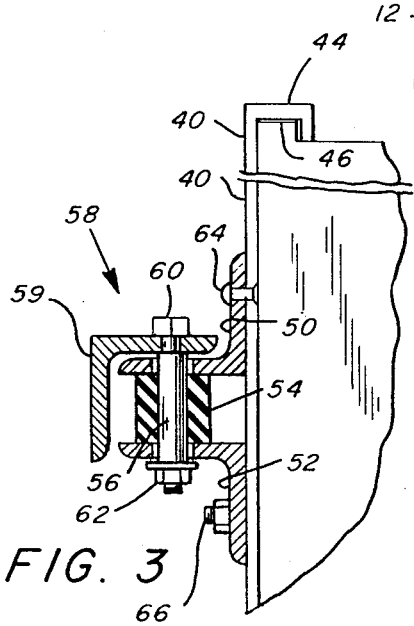
FIG. 3 indicates a detail of the shock mounts and the method of attachment of the wind screen to the van body.

FIG. 3 indicates one possible type of bracket means that can be used to support the air deflector wind screen. The wind screen itself can be made of thin sheets of rigid construction, of metal or plastic or combinations thereof. These might be hinged at the front edge 26 so as to be adjustable to different widths of van bodies. However, the joint can be a rigid one at the front edge and top and bottom surfaces can be applied to make the entire structure even more rigid. The bracket means indicated generally by the numeral 58 is shown in FIG. 3. It includes an angle piece 59 attached to the screen, which is attached by bolt means 60 and nut 62 through a tube 56. The tube 56 is rubber welded to a rubber cylinder 54 which is welded between two angle brackets 50 and 52 attached to strap 40. There is an oversized opening in the angles 50 and 52 to permit relative motion of the tube 56 under the effects of vibration and the flexibility of the rubber portion 54. There is a strap 40 which is supported by a hook 44 which can be locked over a ridge 46 along the front edge of the roof of the van. Similarly, there is a hook 44' (FIG. 2) which hooks over a corresponding ridge on the bottom of the front wall. These two portions are brought together, as shown in FIG. 2, and pulled tightly together by means of a turn buckle 70 or other screw device, so that the strap 40 going to the top and 40' going to the bottom are pulled together to tightly attach the bracket 58 to this strap and to the front wall of the van. The angle brackets 50 and 52 can be attached by rivets 64 or bolts 66 to the strap 40 or the bolts 66 may be passed directly through the wall of the van without the use of the straps 40 and 40'. A horizontal strap like 40 may be used in addition to the vertical straps 40, 40'.

Figure 4:
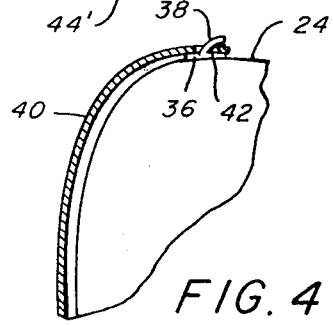
FIG. 4 illustrates an alternative method of attachment.

FIG. 4 illustrates another means of fastening of the straps 40, 40' to the van body. This involves the use of a bracket 36 which has a hook or post 38. The strap 40 has an opening 32 near the end. The opening 32 is placed over the hook 38 and anchored in that manner. The straps 40 and 40' are pulled together by the turn buckle 70 etc.

What has been described is a simple, inexpensive, effective wind screen device that can be attached to the front upper portion of a van so as to minimize air pressure in traveling through the air. The device can be entirely closed, or opened on top and bottom. It can be made for rapid mounting and demounting, as shown.

While the invention has been described with a certain degree of particularity, it is manifest that many changes may be made in the details of construction and the arrangement of components. It is understood that the invention is not to be limited to the specific embodiment set forth herein by way of exemplifying the invention, but the invention is to be limited only by the scope of the attached claim or claims, including the full range of equivalency to which each element or step thereof is entitled.

What is claimed:

1. In a transport vehicle system having a rectangular parallelopiped shaped van body of greater height than the cab associated therewith, said van presenting a vertical transverse front wall above said cab to the oncoming stream of air as said vehicle system moves forward, the improvement in air deflector means comprising:
  a. a triangular prism-shaped air deflector means comprising at least two walls attached together along their first vertical front edges and spread apart at their second vertical back edges;
  b. bracket means removably attached to said van at the front surface thereof; and
  c. means to removably attach said walls at their second vertical edges to said bracket means.

2. The deflector means as in claim 1 including triangular sheet means attached to the top and bottom edges of said at least two walls.

3. The deflector means as in claim 1 including vertical strap means removably attachable along both vertical edges of said front wall of said van, said bracket means attached to said strap means.

4. The deflector means as in claim 3 in which said strap means have perforations in the top and bottom ends, which perforations are hooked over posts attached to the top and bottom front edges of said van.

5. The deflector means as in claim 4 including at least one horizontal strap means attached to said vertical strap means.

6. The deflector means as in claim 1 in which said bracket means are bolted to said van.

7. The deflector means as in claim 1 in which said bracket means includes shock mount means, said deflector removably attached to said shock mount means.

* * * * *